(12) United States Patent
Mudgal et al.

(10) Patent No.: US 11,737,476 B2
(45) Date of Patent: Aug. 29, 2023

(54) FORMULATIONS AND METHODS OF PREPARING PRODUCTS WITH MEAT-LIKE TEXTURE WITH PLANT-BASED PROTEIN SOURCES

(71) Applicant: The Hershey Company, Hershey, PA (US)

(72) Inventors: Prashant Mudgal, Harrisburg, PA (US); Supapong Siris, Hummelstown, PA (US)

(73) Assignee: The Hershey Company, Hershey, PA (US)

( * ) Notice: Subject to any disclaimer, the term of this patent is extended or adjusted under 35 U.S.C. 154(b) by 200 days.

(21) Appl. No.: 16/957,630

(22) PCT Filed: Jan. 17, 2019

(86) PCT No.: PCT/US2019/014079
§ 371 (c)(1),
(2) Date: Jun. 24, 2020

(87) PCT Pub. No.: WO2019/143859
PCT Pub. Date: Jul. 25, 2019

(65) Prior Publication Data
US 2021/0106026 A1    Apr. 15, 2021

Related U.S. Application Data

(60) Provisional application No. 62/653,179, filed on Apr. 5, 2018, provisional application No. 62/618,310, filed on Jan. 17, 2018.

(51) Int. Cl.
*A23J 3/14* (2006.01)
*A23J 3/22* (2006.01)
(Continued)

(52) U.S. Cl.
CPC .............. *A23J 3/227* (2013.01); *A23J 3/14* (2013.01); *A23J 3/24* (2013.01); *A23J 3/26* (2013.01);
(Continued)

(58) Field of Classification Search
CPC ...... A23J 3/227; A23J 3/14; A23J 3/26; A23P 30/25; A23V 2002/00
(Continued)

(56) References Cited

U.S. PATENT DOCUMENTS

| 3,863,019 A | 1/1975 | Strommer |
| 3,883,676 A | 5/1975 | Strommer |

(Continued)

FOREIGN PATENT DOCUMENTS

| EP | 3164014 | 5/2017 |
| KR | 20090021368 | 3/2009 |

(Continued)

OTHER PUBLICATIONS

Office Action received for Canadian Patent Application No. 3084067, dated Jun. 18, 2021, 4 pages.
(Continued)

*Primary Examiner* — Hamid R Badr
(74) *Attorney, Agent, or Firm* — Shook, Hardy & Bacon L.L.P.

(57) ABSTRACT

Product formulations and methods of preparing products having a texture, flavor, and/or nutrition profile similar to meat jerky, with the primary protein source including or being a plant-based protein source.

20 Claims, 3 Drawing Sheets

(51) Int. Cl.
  *A23P 30/25*  (2016.01)
  *A23L 19/00*  (2016.01)
  *A23J 3/24*  (2006.01)
  *A23J 3/26*  (2006.01)
  *A23L 5/10*  (2016.01)
  *A23J 1/14*  (2006.01)

(52) U.S. Cl.
  CPC .............. *A23L 19/09* (2016.08); *A23P 30/25* (2016.08); *A23J 1/14* (2013.01); *A23L 5/10* (2016.08); *A23V 2002/00* (2013.01)

(58) Field of Classification Search
  USPC .......................................................... 426/656
  See application file for complete search history.

(56) References Cited

U.S. PATENT DOCUMENTS

| | | | |
|---|---|---|---|
| 3,930,044 | A | 12/1975 | Van de Rovaart et al. |
| 4,031,267 | A | 6/1977 | Berry et al. |
| 4,039,694 | A | 8/1977 | Giddey et al. |
| 4,052,517 | A | 10/1977 | Youngquist |
| 4,099,455 | A | 7/1978 | Wenger et al. |
| 4,128,051 | A | 12/1978 | Hildebolt |
| 4,226,576 | A | 10/1980 | Hildebolt |
| 4,247,574 | A | 1/1981 | Utena et al. |
| 4,379,084 | A | 4/1983 | Teranishi |
| 4,490,396 | A | 12/1984 | Hsu et al. |
| 5,368,873 | A | 11/1994 | Aebi et al. |
| 5,645,876 | A | 7/1997 | Subramaniam et al. |
| 6,309,681 | B1 | 10/2001 | Prasad et al. |
| 6,579,562 | B1 | 6/2003 | Darke |
| 6,660,310 | B2 | 12/2003 | Carlson |
| 7,118,772 | B2 | 10/2006 | Froseth et al. |
| 8,529,976 | B2 | 9/2013 | McMindes et al. |
| 9,491,958 | B2 | 11/2016 | Markedal et al. |
| 10,477,882 | B1 * | 11/2019 | Wang .................. A23J 3/26 |
| 2005/0163912 | A1 * | 7/2005 | White .................. A23B 4/03 426/641 |
| 2008/0118607 | A1 | 5/2008 | Sandoval et al. |
| 2008/0226811 | A1 | 9/2008 | Boursier et al. |
| 2009/0291189 | A1 | 11/2009 | Christian et al. |
| 2009/0297671 | A1 | 12/2009 | Basker et al. |
| 2010/0074989 | A1 | 3/2010 | Manski |
| 2010/0074998 | A1 | 3/2010 | Espeleta Vega |
| 2011/0256279 | A1 | 10/2011 | Roy et al. |
| 2012/0009287 | A1 | 1/2012 | Pickardt |
| 2012/0093994 | A1 | 4/2012 | Hsieh et al. |
| 2015/0289542 | A1 | 10/2015 | den Dulk |
| 2016/0095329 | A1 | 4/2016 | Roos |
| 2017/0105428 | A1 | 4/2017 | Kivelä |
| 2017/0105438 | A1 | 4/2017 | Ajami et al. |
| 2017/0265508 | A1 | 9/2017 | Roy et al. |
| 2017/0303558 | A1 | 10/2017 | Eisner |
| 2018/0271132 | A1 | 9/2018 | Anderson et al. |
| 2018/0368442 | A1 * | 12/2018 | Dieker .................. A23J 3/227 |

FOREIGN PATENT DOCUMENTS

| | | | |
|---|---|---|---|
| KR | 20160076285 A | 6/2016 | |
| WO | 2003/022063 A1 | 3/2003 | |
| WO | 2017/046659 A1 | 3/2017 | |
| WO | WO-2017046659 A1 * | 3/2017 | ............... A23J 3/14 |

OTHER PUBLICATIONS

"Meat substitute products on the basis of plant proteins", Food Marketing & Technology, vol. 30, pp. 28-30 (2016).
Osen et al., "High moisture extrusion cooking of pea protein isolates: raw material characteristics, extruder responses, and texture properties", Journal of Food Engineering, vol. 127, pp. 67-74 (2014).
Osen et al., "Effect of high moisture extrusion cooking on protein-protein interactions of pea (*Pisum sativum* L.) protein isolates", International Journal of Food Science & Technology, vol. 50, pp. 1390-1396 (2015).
Ray et al., "Properties of an extruded jerky-type meat snack containing potato flour", Journal of Muscle Foods, vol. 7, pp. 199-212 (1996).
"Tastes Like Chicken", Wired, vol. 21, p. 144 (2013).
Canadian Office Action received for Canadian Patent Application No. 3,084,067, dated Jan. 10, 2022, 3 pages.
"Boiling point", What's Cooking America Retrieved from Internet URL : https://web.archive.org/web/20030209003359/https://whatscookingamerica.net/boilpoint.htm, accessed on Oct. 22, 2022, pp. 8, (2003).
"Healthy Recipes", Phillips, 66 Pages (2012).
"Scientific America: Saucy Science: Exploring the Science of Marinades", By Science Buddies, 5 pages (Jul. 10, 2014).
"Whey Protein Concentrate (WPC)", Agricultural Analytics Division for the USDA National Organic Program, pp. 1-18 (Apr. 24, 2015).
"Legend of Thousand Layer Tofu", Earth Source Foods, Retrieved from Internet URL : https://www.earthsourcefoods.com.au/blogposts/2016/4/27/the-legend-of-thousandlayer-tofu, accessed on Oct. 20, 2022, pp. 4 (2016).
Hillman,H., "Boiling points of water", Kitchen Science, 1 page (Feb. 9, 2003).
Williams, B., "How to Make Marinated Mushrooms", Retrieved from Internet URL : https://web.archive.org/web/20160321134758/https://www.foodrepublic.com/recipes/how-to-make-marinated-mushrooms/, accessed on Oct. 11, 2021, pp. 3 (Feb. 13, 2012).
Bruton, J., "What exactly does a marinade do? What are the generic components?", AskCulinary, 3 pages, (Sep. 7, 2012).
Valeria, "Russian Lacto Fermented Mushrooms", Retrieved from Internet URL : https://web.archive.org/web/20170309200951/https://www.beetsandbones.com/russian-lacto-fermented-mushrooms/, accessed on Oct. 11, 2022, pp. 7 (Jan. 10, 2017).
International Preliminary Report on Patentability received for PCT Patent Application No. PCT/US2019/014079 dated Jul. 30, 2020, 7 pages.
Non-Final Office Action dated Dec. 29, 2021 in U.S. Appl. No. 16/815,386, 18 pages.
Final Office Action dated Jul. 14, 2022 in U.S. Appl. No. 16/815,386, 17 pages.
Office Action received for Canadian Patent Application No. 3084067, dated Sep. 28, 2022, 4 pages.

* cited by examiner

FORMULATIONS AND METHODS OF PREPARING PRODUCTS WITH MEAT-LIKE TEXTURE WITH PLANT-BASED PROTEIN SOURCES

CROSS REFERENCE TO RELATED APPLICATIONS

This application is a national stage application, filed under 35 U.S.C. § 371, of International Patent Application No. PCT/US2019/014079, filed Jan. 17, 2019, and entitled "Formulations and Methods of Preparing Products With Meat-Like Texture with Plant-Based Protein Sources," which claims the benefit of priority of both U.S. Provisional Application No. 62/618,310, filed on Jan. 17, 2018, and U.S. Provisional Application No. 62/653,179, filed Apr. 5, 2018, the entirety of each of which is incorporated herein by reference.

TECHNICAL FIELD

This application is directed to formulations and methods of preparing products having a texture, flavor, and/or nutrition profile similar to meat, with the primary protein source including or being at least one plant-based protein source.

BACKGROUND

To mimic the texture and flavor of meat using plant-based protein sources is a very challenging task. The complexity increases further if gluten and soy proteins, which are predominantly used to make fibrous meat-like textures, are avoided. Particularly, gluten and soy proteins have specific chemical make-ups that facilitate the formation of fibrous textures and that are not generally found in other plant-based proteins.

It would be desirable to provide a comestible product having a texture and a flavor similar to meat using plant-based protein sources.

SUMMARY

Exemplary embodiments are directed to plant-based products having an anisotropically fibrous meat-like texture. Among the advantages of certain exemplary embodiments are shelf stability, a tender meat-like texture, an anisotropically fibrous nature, a flavor similar to meat, a texture similar to meat, a plant-based product that is free of soy proteins, a plant-based product that is gluten-free, a plant-based product that is free of the beany off-note flavor commonly found in plant protein-based formulations, or any combination thereof.

Exemplary embodiments employ a high-moisture extrusion cooking (HMEC) process to produce a plant-based product. The process includes heating and extruding a composition under a condition of high moisture, high temperature, and high shear in a cooker-extruder. The process further includes cooling the composition under laminar flow in a cooling die to form the plant-based product. The resulting plant-based product has an anisotropically fibrous meat-like texture.

One general aspect includes a process, including: forming a dry blend of a composition by combining at least two plant-based protein sources, where the at least two plant-based protein sources provide the at least 50% of the dry blend by weight; and heating and extruding the composition under a condition of high moisture, high temperature, and high shear in a cooker-extruder; cooling the composition under laminar flow in a cooling die to provide an extrudate; and drying the extrudate. The extrudate has at least one of a strain-force-max tension in a range of 1.35 to 1.45 on a log-scale and a hardness in a range of 2.8 g to 3.3 g.

One general aspect includes a plant-based product including: an extrudate formed from a composition including at least two plant-based protein sources, where the at least two plant-based protein sources provide at least 50% of the jerky composition by weight. The extrudate has at least one of a strain-force-max tension in a range of 1.35 to 1.45 on a log-scale and a hardness in a range of 2.8 g to 3.3 g.

The foregoing has broadly outlined some of the aspects and features of the various embodiments, which should be construed to be merely illustrative of various potential applications of the disclosure. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DETAILED DESCRIPTION

Figure 1:
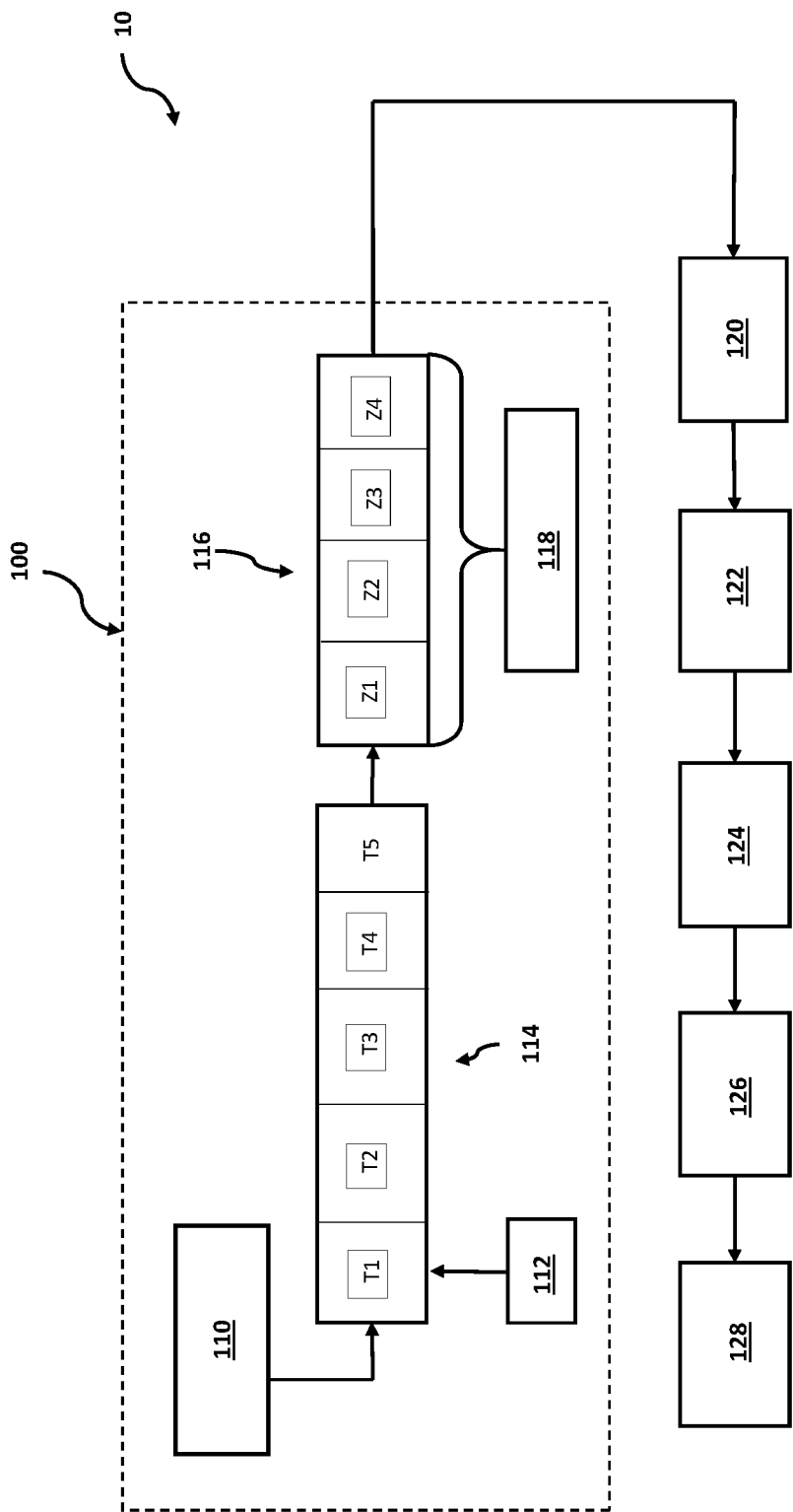
FIG. 1 is a schematic illustration of a plant-based jerky forming system according to an embodiment of the present disclosure.

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

This application is directed to formulations and methods of preparing products having a texture, flavor, and/or nutrition profile similar to meat, with the primary protein source including or being a plant-based protein source. One such application is the formulation and preparation of plant-based jerky. However, it should be understood that the formulations and methods described herein are applicable to other products that have a meat-like texture with the primary protein source including or being a plant-based protein source.

Plant-based jerky formulations and methods of preparing plant-based jerky are described in detail below. Plant-based jerky is a convenient, ready-to-eat, hand-to-mouth snack. In particular, a plant-based jerky is comestible product having a texture, flavor, and nutrition profile similar to a meat jerky but a composition including protein from mostly plant-based protein sources or, in some embodiments, entirely plant-based protein sources. A meat-like texture is a consumer-preferred texture and/or a consumer-preferred sensory experience.

A plant-based jerky with a fibrous texture that is in a range of consumer-preferred meat-jerky textures was achieved. Various texture analysis parameters may be used to quantify texture. Preferred textural analysis parameters correlate to sensory mouthfeel. For example, the hardness as measured by a texture profile analysis (TPA) test and the strain-force-max tension as measured by a tension test are parameters that are found to strongly correlate to sensory mouthfeel. In exemplary embodiments, both of these two parameters for a plant-based jerky are similar to those of conventional meat jerky.

The strain-force-max tension was found to be about 1.4 on a log-scale and the hardness was found to be about 3.1 grams for beef jerky. In exemplary embodiments, the plant-based jerky has a strain-force-max tension from a tension test in the range of about 1.35 to about 1.45 on a log-scale, or any value, range, or sub-range therebetween. In exemplary embodiments, the plant-based jerky has a hardness in the range of about 2.8 g to about 3.3 g, alternatively about 2.9 g to about 3.2 g, alternatively about 3.0 g to about 3.2 g, or any value, range, or sub-range therebetween.

Dry Blend Formulation

In exemplary embodiments, the plant-based jerky is made from sustainable, affordable ingredients, and/or provides good nutritional quality. For example, the plant-based jerky includes at least eight grams of plant-based protein or alternatively at least ten grams of plant-based protein, at least 20% fewer calories than meat jerky, at least two grams of dietary fiber, at least 10% of the recommended daily allowance (RDA) of at least one major vitamin without fortification, and/or less than six grams of sugar in a 28 g (1 oz.) serving.

In exemplary embodiments, the plant-based jerky is gluten-free and/or free of soy proteins in the jerky base (it will be appreciated however, that soy sauce—which may contain some amount of soy protein—may still be used as a flavoring in the jerky composition). In some embodiments, small amounts of gluten or soy protein may be included in a formulation to possibly increase extruder throughput or minimize waste, as desired.

In exemplary embodiments, the plant-based jerky has a savory, meat-like flavor and smell; a chewy, soft, mouth-coating texture; at least 25% less sodium than meat jerky; a cost by weight no greater than meat jerky; or any combination thereof. In exemplary embodiments, the plant-based jerky is free of meat, artificial flavors, artificial colors, artificial preservatives, artificial sweeteners, monosodium glutamate (MSG), gluten, nitrates, genetically-modified organisms (GMOs), or any combination thereof.

In exemplary embodiments, the raw materials of a plant-based jerky composition include at least two plant-based protein sources. Dietary fiber is optionally included in the plant-based jerky composition to enhance the fiber content of the plant-based jerky. Oil and/or starch are optionally included in the plant-based jerky composition to enhance the texture of the plant-based jerky. After formation of a plant-based jerky by an HMEC process, a marinade composition, which may include, but is not limited to, molasses, vinegar, soy sauce, sugar, and/or additional seasoning, may be applied to the plant-based jerky.

In exemplary embodiments, the dietary fiber is optionally present in an amount by weight of a dry blend of the jerky composition of up to about 25%, alternatively up to about 15%, alternatively about 6% to about 25%, alternatively about 3% to about 25%, alternatively about 5% to about 24%, alternatively about 6% to about 15%, alternatively about 20% or less, alternatively about 14% or less, or any amount, range, or sub-range therebetween. Fiber content at 8% lead to maximum efficiency of the process. Higher fiber content reduced yield efficiency.

In exemplary embodiments, the dietary fiber is present in the jerky composition in an amount such that the plant-based jerky is a good source of dietary fiber. In exemplary embodiments, the dietary fiber is a plant-based dietary fiber. Plant-based dietary fibers may include, but are not limited to, pea fiber, apple fiber, oat fiber, bamboo fiber, cottonseed fiber, inulin, potato fiber, rice fiber, corn fiber, or combinations thereof.

In exemplary embodiments, the oil is optionally present in an amount by weight of a dry blend of the jerky composition of up to about 9%, alternatively about 3% to about 13%, alternatively about 3% to about 9%, alternatively about 6% to about 8%, or any amount, range, or sub-range therebetween.

In some embodiments, the amount of oil already present in one or more of the plant-based protein sources is sufficient to produce a plant-based jerky with a texture similar to meat jerky without a need to introduce a separate oil source in the dry blend. If additional oil is separately added, the added oil may be from any source. However, like the bulk of the protein, added oil is preferably also plant-based. Plant-based oils may include, but are not limited to, canola oil, sunflower oil, cottonseed oil, olive oil, palm oil, sesame oil, or combinations thereof.

In exemplary embodiments, the starch is optionally present in an amount by weight of a dry blend of the jerky composition of up to about 10%, alternatively up to about 3%, alternatively up to about 2%, alternatively about 1% to about 3%, alternatively about 1.5% to about 1.7%, alternatively about 1.6%, or any amount, range or sub-range therebetween.

In some embodiments, the amount of starch already present in one or more of the plant-based protein sources (e.g., faba beans) is sufficient to produce a plant-based jerky with a texture similar to meat jerky without a need to introduce a separate starch source in the dry blend. If additional starch is separately added, the added starch may be from any source. However, like the bulk of the protein, added starch is preferably also plant-based.

In exemplary embodiments, the at least two plant-based protein sources are present in a combined amount such that the protein content, by weight, of a dry blend of the jerky composition is about 45% to about 80%, alternatively about 58% to about 73%, alternatively about 66% to about 74%, alternatively about 70% to about 74%, or any amount, range, or sub-range therebetween. In exemplary embodiments, a first plant-based protein and a second plant-based protein, in combination, provide at least 80% or at least 90% of the total protein content, by weight in the dry blend of the jerky composition. In some embodiments, the at least two plant-based protein sources are or include one or more vegetable-based protein sources.

In some embodiments, the at least two plant-based protein sources include protein powders, isolates, and/or concentrates. Exemplary protein sources include pea protein isolate, faba bean protein concentrate, a pea protein, a faba bean protein, a canola protein, a lentil protein, a chickpea protein, a pulse protein, gluten, a potato protein, a rice protein, a wheat protein, a soy protein, or any combination thereof. In exemplary embodiments, the at least two plant-based protein sources are a blend including at least one plant-based protein isolate and at least one plant-based protein concentrate. The concentrate source provides components such as starch, fiber, and oil that gives texture and cohesiveness to the extrudate. In some embodiments, the at least two plant-based protein sources are a blend of faba bean protein and pea protein.

In exemplary embodiments, the at least two plant-based protein sources are selected to provide an amino acid profile having a level of free thiol groups within a predetermined range for crosslinking by disulfide bond formation. In some embodiments, the normalized cysteine content of the at least two plant-based protein sources is, by weight per gram of dry plant-based protein sources, about 5 mg to about 15 mg, alternatively about 10 mg, or any amount, range, or sub-range therebetween.

In exemplary embodiments, 0.7% salt was added to the dry blend formulation to improve flavor of a resulting extrudate and also improve flavor retention during a marination process. The range of salt could be between 0 to 2% of the total dry blend formulation ideally less than 1% of the dry blend formulation.

System and Process

Referring to FIG. 1, a system 10 for forming jerky includes a high-moisture extrusion cooking (HMEC) system 100. The HMEC system 100 includes a dry ingredient blend feeder 110, a water feeder 112, a cooker-extruder 114, and a cooling die 116 with a heat/cool system 118. In addition the system 10 includes a cooling conveyor 120, a tenderizer 122, a refrigerator/freezer 124, a vacuum tumbler 126, and a dryer 128.

Figure 2:
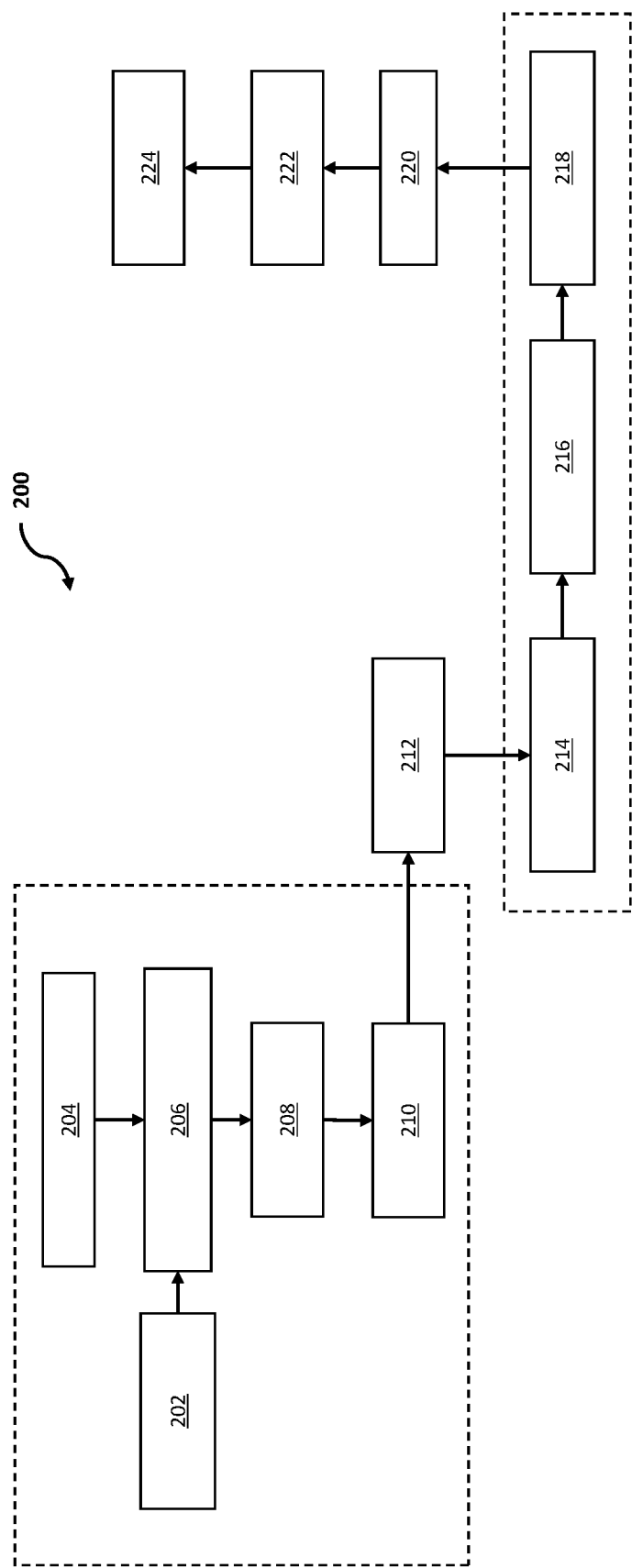
FIG. 2 is a schematic illustration of a plant-based jerky forming process according to an embodiment of the present disclosure.

Referring to FIGS. 1-2, a process 200 of forming a plant-based jerky includes a dry blend supply step 202 including formulating a dry blend of a plant-based jerky composition and supplying the dry blend of a plant-based jerky composition to the dry ingredient blend feeder 110 of the HMEC system 100. In the dry blend supply step 202, raw ingredients are mixed together to form the dry blend of the plant-based jerky composition. The dry ingredient blend feeder 110 supplies the dry blend to the cooker-extruder 114. According to a water supply step 204, water is separately supplied to the cooker-extruder 114 by the water feeder 112.

The relative feed rates of the dry blend and the water are controlled by the dry ingredient blend feeder 110 and the water feeder 112, respectively, to control the moisture content of the composition. In exemplary embodiments, water is supplied to the cooker-extruder 114 at a rate relative to the rate of supplying the dry blend plant-based jerky composition to the cooker-extruder 114 such that the moisture content is, by percentage of combined weight of the water and the dry blend, about 40%, about 40% to about 80%, about 45% to about 60%, alternatively about 48% to about 55%, alternatively about 50%, or any amount, range, or sub-range therebetween. In exemplary embodiments, the plant-based jerky product has a final water activity after drying of about 0.78 to about 0.84, alternatively about 0.8, or any amount, range, or sub-range therebetween.

The cooker-extruder 114 has a number of zones T1-T5 that increase the temperature of the dry blend. As an example, the cooker extruder 114 has an inlet temperature of about 60° C. (140° F.) and an exit temperature of about 150° C. (302° F.) to about 160° C. (320° F.). Although the cooker-extruder 114 of the HMEC system 100 of FIG. 1 has five zones, the cooker-extruder 114 may have any number of appropriate zones.

Figure 3:
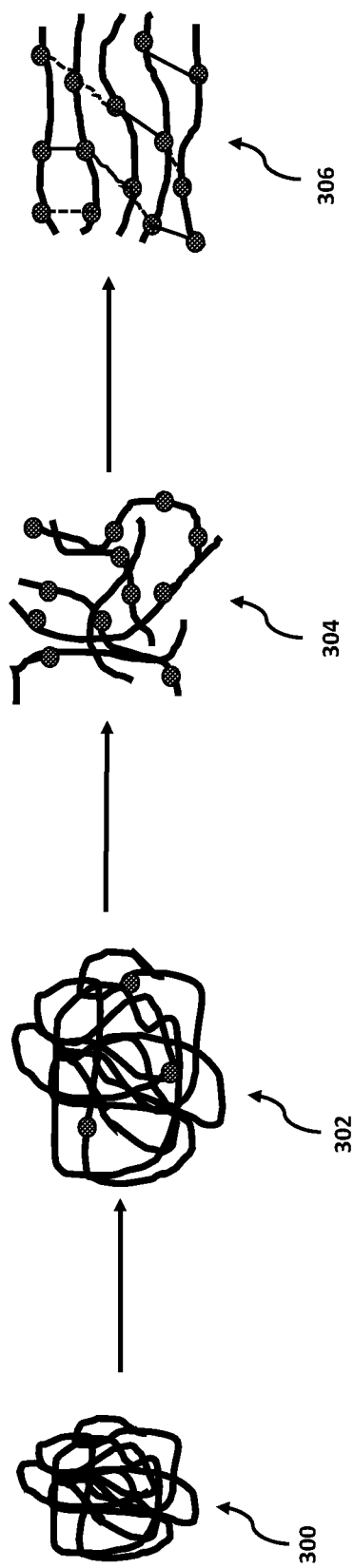
FIG. 3 is a schematic illustration of protein texturization during high-moisture extrusion cooking according to an embodiment of the present disclosure.

According to a cooking extruder step 206, the dry blend passes through the cooker-extruder 114 under high moisture, shear, and increasing temperatures. Referring momentarily to FIG. 3, the plant-based proteins of a plant-based jerky composition 300 may be supplied to the HMEC system 100 in a native folded state. In the cooker-extruder 114, the plant-based protein of the dry blend denatures and dissociates into subunits, losing its native structure under the high moisture, high temperature, and high shear conditions.

In particular, in the first two zones T1-T2 of the cooker-extruder 114 of the HMEC system 100, applied heat raises the temperature of a native state of protein 300 in the composition to the range of about 60° C. to about 90° C. (about 140° F. to about 194° F.), and moisture and shear are applied to the plant-based proteins, causing hydration, mixing, and partial denaturation of the plant-based proteins 302.

Partially denatured protein 302 moves through cooking extruder zones T2-T5. Here, the additional applied heat raises the temperature from about 90° C. (about 194° F.) to about 160° C. (about 320° F.) and shear in the form of specific mechanical energy in the range of about 120 kJ/kg to about 180 kJ/kg causes denaturation of the plant-based proteins 304 and exposure of reactive sites.

Proteins in the jerky composition are plasticized at temperatures above 140° C. (284° F.) using steam injection, which denatures the proteins 304. At these high temperatures, the denatured proteins dissociate into subunits. In addition to denaturing the protein, the cooker-extruder gelatinizes the starch, if present, of the jerky composition.

Continuing with FIGS. 1-2, the cooked, extruded jerky composition is then supplied to the cooling die 116. The cooling die 116 has a number of zones Z1-Z4 that decrease the temperature of the cooked extruded jerky composition. For example, the cooling die 116 has an inlet temperature of about 135° C. (275° F.) and an outlet temperature of about 50° C. (122° F.) to about 70° C. (158° F.). Although the cooling die of the HMEC system of FIG. 1 has four zones, a cooling die may have any number of appropriate zones.

At a cooling die step 208, the cooked extruded jerky composition passes through the cooling die 116 where it is cooled. Referring again to FIG. 3, the denatured proteins 304 are extruded through a die to undergo a laminar flow, which aligns the denatured protein molecules into planes, forming three-dimensional fibrous structures 306 upon cooling. The laminar flow and cooling in the cooling die 116 allow protein subunits to rearrange into sheet-like fibrillar structures 306. Under cooling and laminar flow, cross-linking and alignment of the denatured protein 304 occurs via covalent sulfur-sulfur (S—S) linkage and non-covalent interactions. The resulting output from the extruder is an anisotropic fibrous network of proteins. The sheet-like fibrillar structures 306 exit the cooling die 116 as a wet extrudate 210 of a plant-based jerky.

Continuing with FIG. 2, the process 200 includes additional steps to make the extrudate 210 into a plant-based jerky. At a tenderization step 212, the wet extrudate 210 is tenderized with the tenderizer 122. At a series of marinating steps, the tenderized extrudate is frozen in the freezer 124 at a freezing step 214 and thawed in the refrigerator 124 at a thawing step 216 before marinating the thawed extrudate in the vacuum tumbler 126 at a marinating step 218. Freezing the extrudate at the freezing step 214 and then thawing the extrudate at the thawings step 216 improves the incorporation of flavors in the plant-based jerky 224 during the marinating step 218. Ice crystals created during the freezing cycle allow more marinade retention. The marinating step 218 can include either soaking the extrudate or marinating the extrudate in a vacuum tumbler. In exemplary embodiments, the marinating occurs overnight under refrigeration.

The marinated extrudate is then seasoned at a seasoning step 220. In certain embodiments, the seasoning is part of the marinade, removing the need for seasoning as a separate step.

The seasoned extrudate is dried at a drying step 222 to form a plant-based jerky 224. In exemplary embodiments, the drying occurs in a smokehouse.

As will be readily appreciated by those skilled in the art, conditions of the HMEC system, in addition to the jerky composition itself, aid in providing a plant-based jerky with a meat-like texture, a meat-like flavor, a meat-like nutrition profile, or any combination thereof.

EXAMPLES

The invention is further described in the context of the following examples which are presented by way of illustration, not of limitation.

Protein Characterization.

Certain properties of proteins from certain non-meat protein sources, including yeast, pea, lentil, faba bean, canola, algae, rice, wheat, soy, and whey sources, including certain concentrates and isolates, were measured for each protein source individually to evaluate each protein source for inclusion in a jerky composition. Tested properties included the amino acid profile, the sulfur content, the relative solubility of the protein under alkaline conditions, the protein purity, the relative rankings of disulfide bond presence as measured by sodium dodecyl sulfate polyacrylamide gel electrophoresis (SDS-PAGE), and the relative rankings of molecular weights of the soluble fraction as measured by SDS-PAGE.

Table 1 shows the sulfur content of the tested fourteen different non-meat protein sources as measured by SDS-PAGE and amino acid profiling. The relative presence of disulfide bonds was assessed by SDS-PAGE. Cysteine and methionine content were measured by amino acid profiling.

The importance of cysteine is considered to be in its participation in disulfide bond formation. Methionine is believed to play an important role in protein structure because it is one of the most hydrophobic amino acids, which may be important for non-covalent interactions during texturization. Pulse-based proteins tend to have a relatively low methionine content, but a higher methionine content improves the protein content as an essential amino acid.

TABLE 1

Sulfur content of protein sources

| Protein | Normalized Cysteine (mg/g protein) | Normalized Methionine (mg/g protein) | Normalized Total (mg/g protein) |
|---|---|---|---|
| Canola protein isolate | 35.40 | 21.82 | 57.21 |
| Whey protein concentrate | 28.75 | 23.75 | 52.50 |
| Vital wheat gluten | 23.25 | 15.75 | 39.00 |
| Rice protein | 17.5 | 37 | 54.5 |
| Soy protein | 12.55 | 13.85 | 26.40 |
| Yellow pea protein | 12.33 | 9.34 | 21.67 |
| Faba protein concentrate | 11.52 | 7.84 | 19.36 |
| Lentil protein | 9.82 | 7.85 | 17.68 |
| Pea protein isolate #1 | 10.45 | 11.62 | 22.06 |
| Pea protein isolate #2 | 9.84 | 10.81 | 20.65 |
| Pea protein isolate #3 | 9.10 | 10.53 | 19.63 |
| Pea protein isolate #4 | 8.7 | 9.8 | 18.5 |
| Pea protein isolate #5 | 8.7 | 9.8 | 18.5 |
| Whole algal protein | 6.70 | 8.60 | 15.30 |
| Yeast protein hydrolysate | 5.8 | 20.2 | 26.00 |

First Trial.

Based on the results of the initial evaluation of the non-meat protein sources of Table 1, the plant-based jerky compositions of Table 2 were formulated. Each of the plant-based jerky formulations of Table 2 was successfully processed through an HMEC system to form a plant-based jerky, except for Samples 12 and 13, which showed poor ribbon formation. The plant-based jerky formulations included variations of the type and amount of protein source or combination of protein sources, the presence and amount of gluten, the presence and amount of additional fiber, the presence and amount of additional starch, and the presence and amount of additional oil.

The general conditions for the HMEC system 100 were similar for all samples, including an initial total moisture percentage in the range of about 46% to about 57% by weight, a cooker-extruder 114 inlet temperature of about 60° C. (140° F.), a cooker-extruder 114 outlet temperature of about 145° C. (293° F.) to about 160° C. (320° F.), and a specific mechanical energy in the range of about 125 kJ/kg to about 180 kJ/kg.

TABLE 2

| Plant-based jerky formulations (% by weight) | | | | | | | | | | | | | | |
|---|---|---|---|---|---|---|---|---|---|---|---|---|---|---|
| Ingredients | 1 | 2 | 3 | 4 | 5 | 6 | 7 | 8 | 9 | 10 | 11 | 12 | 13 | 14 |
| Pea protein isolate #5 | 86.3 | 83.3 | 80.3 | 97 | 94 | 52.8 | 50 | 80 | 64.4 | 46.9 | | | | |
| Faba protein concentrate | | | | | | 27.2 | 50 | | | 13.3 | 55 | 80 | 60 | 55 |
| Vital wheat gluten | | | | | | | | 20 | 30.6 | 26.5 | 20 | 20 | 40 | 40 |

TABLE 2-continued

| | Plant-based jerky formulations (% by weight) | | | | | | | | | | | | | |
|---|---|---|---|---|---|---|---|---|---|---|---|---|---|---|
| Ingredients | 1 | 2 | 3 | 4 | 5 | 6 | 7 | 8 | 9 | 10 | 11 | 12 | 13 | 14 |
| Pea fiber | | | | 3 | 6 | 5 | | | | 13.3 | 10 | | | |
| Sorghum flour waxy | 13.7 | 13.7 | 13.7 | | 10 | | | | | | 10 | | | |
| Canola oil | | 3 | 6 | | 5 | | | 5 | | | 5 | | | 5 |

Moisture content measurement, micro analysis, TPA, texture cut tests, informal sensory studies, protein interaction characterization, and water activity measurements were performed on the plant-based jerky products. Certain plant-based jerky compositions including multiple plant-based protein sources were found to form plant-based jerky having a texture similar to meat jerky without the addition of any separate starch or oil ingredients.

Sample 7, a 50:50 by weight blend of faba bean protein and pea protein with no soy protein, no gluten, and no additional starch or oil being added, was found to be an exemplary embodiment of a plant-based jerky composition. An exemplary amount of protein to provide a meat-like texture was also determined.

Second Trial.

Based on the results of the first trial of the plant-based jerky formulations of Table 2, the additional plant-based jerky compositions of Table 3 were formulated to evaluate the protein ratios. The plant-based jerky formulations included variations of the relative amounts of pea protein isolate and faba protein concentrate, the presence of gluten, the presence of additional fiber, the presence of additional starch, and the presence of additional oil. Each of the plant-based jerky formulations of Table 3 was processed similar to the formulation of Table 2 to form a plant-based jerky.

The general conditions for the HMEC system 100 were similar for all samples, including an initial total moisture percentage in the range of about 48% to about 56% by weight, a cooker-extruder 114 inlet temperature of about 60° C. (140° F.), a cooker-extruder 114 outlet temperature of about 140° C. (284° F.) to about 150° C. (302° F.), and a specific mechanical energy in the range of about 120 kJ/kg to about 175 kJ/kg.

TABLE 3

| | Plant-based jerky formulations (% by weight) | | | | | | | |
|---|---|---|---|---|---|---|---|---|
| Ingredients | 15 | 16 | 17 | 18 | 19 | 20 | 21 | 22 |
| Pea protein isolate #5 | 75 | 70 | 70 | 60 | 50 | 40 | 30 | 40 |
| Faba protein concentrate | 20 | 27 | 30 | 40 | 50 | 60 | 70 | 40 |

TABLE 3-continued

| | Plant-based jerky formulations (% by weight) | | | | | | | |
|---|---|---|---|---|---|---|---|---|
| Ingredients | 15 | 16 | 17 | 18 | 19 | 20 | 21 | 22 |
| Gluten | | | | | | | | 20 |
| Pea fiber | 3 | 3 | | | | | | |
| Canola oil | 2 | | | | | | | |

Moisture content measurement, micro analysis, TPA, texture cut tests, informal sensory studies, protein interaction characterization, and water activity measurements were performed on the plant-based jerky products. Certain plant-based jerky compositions including multiple plant-based protein sources were found to form plant-based jerky having a texture similar to meat jerky without the addition of any separate starch or oil ingredients. For example, for one of the samples, strain-force-max tension was 1.41 and hardness was 3.06. Samples 15-21, blends of faba bean protein and pea protein in the range of 30:70 to 70:30 by weight with no soy protein, no gluten, and no additional starch or oil being added, were found to be exemplary embodiments of plant-based jerky compositions.

Third Trial.

Based on the results of the first and second trials of plant-based jerky formulations, the plant-based jerky compositions of Table 4 were formulated to evaluate the nutritional profile. The plant-based jerky formulations included variation of the source of pea protein isolate, the relative amounts of pea protein isolate and faba protein concentrate, the presence and amount of canola protein, the presence and amount of additional fiber, the presence of additional oil, sugar, and salt, and the presence and amount of additional seasoning. Each of the plant-based jerky formulations of Table 4 was processed similar to those from the first and second trials to form a plant-based jerky, except for Sample 27, which failed to stabilize in the HMEC system.

The general conditions for the HMEC system 100 were similar for all samples, including an initial total moisture percentage in the range of about 48% to about 56% by weight, a cooker-extruder 114 inlet temperature of about 30° C. (86° F.) to about 60° C. (140° F.), a cooker-extruder 114 outlet temperature of about 145° C. (293° F.) to about 155° C. (311° F.), and a specific mechanical energy in the range of about 145 kJ/kg to about 180 kJ/kg.

TABLE 4

| | Plant-based jerky formulations (% by weight) | | | | | | | | | | | | |
|---|---|---|---|---|---|---|---|---|---|---|---|---|---|
| Ingredients | 23 | 24 | 25 | 26 | 27 | 28 | 29 | 30 | 31 | 32 | 33 | 34 | 35 |
| Pea protein isolate #1 | 60 | | 60 | 75 | 50 | 50 | 59 | 60 | 58 | 60 | 55 | | 100 |
| Pea protein isolate #5 | | 60 | | | | | | | | | | 60 | |
| Faba protein concentrate | 40 | 40 | 35 | 20 | 30 | 40 | 39 | 30 | 28 | 40 | 37 | 40 | |

TABLE 4-continued

| Ingredients | Plant-based jerky formulations (% by weight) | | | | | | | | | | | | |
|---|---|---|---|---|---|---|---|---|---|---|---|---|---|
| | 23 | 24 | 25 | 26 | 27 | 28 | 29 | 30 | 31 | 32 | 33 | 34 | 35 |
| Canola protein | | | | | 20 | 10 | | | | | | | |
| Pea fiber | | | 5 | 3 | | | | | 10 | 14 | | | |
| Canola oil | | | | 2 | | | | | | | | | |
| Table Sugar | | | | | | | | | | | | 3 | |
| Table Salt | | | | | | | | | | | | 1 | |
| Seasoning | | | | | | | 2 | | | | | 4 | |

Moisture content measurement, micro analysis, TPA, texture cut tests, informal sensory studies, protein interaction characterization, and water activity measurements were performed on the plant-based jerky products. Certain plant-based jerky compositions including multiple plant-based protein sources were found to form plant-based jerky having a texture similar to meat jerky without the addition of any separate starch or oil ingredients. Sample 35, however, lacked cohesion and did not result in ribbon formation under the conditions tested. The inclusion of additional fiber, up to at least 14% by weight, still led to a plant-based jerky having a texture similar to meat jerky. Samples 23-25 and 28-34, including blends of faba bean protein and pea protein in the range of 28:58 to 40:60 by weight with no soy protein, no gluten, and no additional starch or oil being added, were found to be good examples of plant-based jerky compositions.

Fourth Trial.

Based on the results of the previous trials of plant-based jerky formulations, a plant-based jerky composition including 20% fiber, by weight, of the dry blend was formulated to evaluate higher fiber compositions. The plant-based jerky formulation was processed similar to those from the previous trials to form a plant-based jerky.

The general conditions for the HMEC system included an initial total moisture percentage in the range of about 52% to about 54% by weight, a cooker-extruder inlet temperature of about 60° C. (140° F.), a cooker-extruder outlet temperature of about 145° C. (293° F.) to about 155° C. (311° F.), and a specific mechanical energy in the range of about 140 kJ/kg to about 185 kJ/kg.

Moisture content measurement, micro analysis, TPA, texture cut tests, informal sensory studies, protein interaction characterization, and water activity measurements were performed on the plant-based jerky product. The inclusion of additional fiber, up to at least 20% by weight, still led to a plant-based jerking having a texture similar to meat jerky. The sample was found to be a good example of a plant-based jerky composition.

While the foregoing specification illustrates and describes exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of forming a plant-based, meat-free comestible product, the process comprising,
    forming a dry blend of a composition by combining at least two plant-based protein sources, wherein the at least two plant-based protein sources provide at least 50% of the dry blend by weight;
    extruding the composition while heating the composition, wherein extrusion comprises a specific mechanical energy in the range from about 120 kJ/kg to about 180 kJ/kg;
    cooling the composition under laminar flow in a cooling die to provide an extrudate; and
    drying the extrudate, wherein the dried extrudate has at least one of a strain-force-max tension in a range of 1.35 to 1.45 on a log-scale and a hardness in a range of 2.8 g to 3.3 g.

2. The process of claim 1, wherein the at least two plant-based protein sources provide at least 90% of the dry blend by weight.

3. The process of claim 1, wherein the at least two plant-based protein sources are not soy proteins.

4. The process of claim 1, wherein composition does not include gluten.

5. The process of claim 1, wherein the composition does not include additional starch.

6. The process of claim 1, wherein the composition does not include additional oil.

7. The process of claim 1, wherein each of the at least two plant-based protein sources have a combined normalized cysteine content of 5 mg to 15 mg per gram.

8. The process of claim 1, wherein the at least two plant-based protein sources comprises a first plant-based protein source and a second plant-based protein source in a weight ratio in the range of 30:70 to 70:30.

9. The process of claim 1, wherein the extrudate is dried to a water activity of 0.78 to 0.84.

10. The process of claim 1, wherein water is supplied at a rate relative to a rate of supplying the dry blend of the composition such that moisture is, by percentage of a combined weight of the water and the dry blend, 45% to 60%.

11. The process of claim 1, wherein the composition is extruded through a heating die, the heating die having a first portion that heats the composition to a temperature from about 60° C. to about 90° C. and a second portion that heats the composition to a temperature from about 90° C. to about 160° C.

12. The process of claim 1, wherein the cooling die comprises an inlet temperature of about 135° C. and an outlet temperature from about 50° C. to about 70° C.

13. The process of claim 1, further comprising:
    freezing and thawing the extrudate; and
    marinating the thawed extrudate.

14. A plant-based, meat free product comprising:
- a fibrous structure formed from a composition comprising at least two plant-based protein sources, wherein the at least two plant-based protein sources provide at least 50% of the composition by weight; and
- wherein the fibrous structure has at least one of a strain-force-max tension in a range of 1.35 to 1.45 on a log-scale and a hardness in a range of 2.8 g to 3.3 g, resulting from an extrusion process that heats the composition to a temperature of about 160° C. and comprises a specific mechanical energy in the range from about 120 kJ/kg to about 180 kJ/kg before cooling the composition under laminar flow through a cooling die comprising an outlet temperature from about 50° C. to about 70° C.

15. The plant-based product of claim 14, wherein the plant-based product has a water activity of about 0.78 to about 0.84.

16. The plant-based product of claim 14, wherein each of the at least two plant-based protein sources are selected to have a normalized cysteine content in a range of 5 mg per gram to 15 mg per gram.

17. The plant-based product of claim 14, wherein the at least two plant-based protein sources provide at least 80% of the weight of the composition.

18. The plant-based product of claim 14, wherein the at least two plant-based protein sources provide at least 90% of the weight of the composition.

19. The plant-based product of claim 14, wherein the plant-based product is gluten-free.

20. A plant-based meat-free comestible product formed by a process comprising:
- forming a dry blend of a composition by combining at least two plant-based protein sources, wherein the at least two plant-based protein sources provide at least 50% of the dry blend by weight;
- extruding the composition while heating the composition, wherein extrusion comprises a specific mechanical energy in the range of about 120 kJ/kg to about 180 kJ/kg;
- cooling the composition under laminar flow in a cooling die to provide an extrudate, the cooling die comprising an outlet temperature of about 50° C.; and
- drying the extrudate, wherein the dried extrudate has at least one of a strain-force-max tension in a range of 1.35 to 1.45 on a log-scale and a hardness in a range of 2.8 g to 3.3 g.

* * * * *